(12) United States Patent
Suzuki et al.

(10) Patent No.: US 10,755,731 B2
(45) Date of Patent: Aug. 25, 2020

(54) APPARATUS, METHOD, AND NON-TRANSITORY COMPUTER-READABLE STORAGE MEDIUM FOR STORING PROGRAM FOR UTTERANCE SECTION DETECTION

(71) Applicant: FUJITSU LIMITED, Kawasaki-shi, Kanagawa (JP)

(72) Inventors: Masanao Suzuki, Yokohama (JP); Chisato Shioda, Kawasaki (JP); Nobuyuki Washio, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 100 days.

(21) Appl. No.: 15/643,576

(22) Filed: Jul. 7, 2017

(65) Prior Publication Data
US 2018/0068677 A1    Mar. 8, 2018

(30) Foreign Application Priority Data
Sep. 8, 2016 (JP) .................. 2016-175765

(51) Int. Cl.
*G10L 25/78* (2013.01)
*G10L 25/84* (2013.01)
(Continued)

(52) U.S. Cl.
CPC .............. *G10L 25/78* (2013.01); *G10L 15/04* (2013.01); *G10L 19/08* (2013.01); *G10L 25/84* (2013.01);
(Continued)

(58) Field of Classification Search
CPC .......... G10L 25/78; G10L 25/84; G10L 15/04
See application file for complete search history.

(56) References Cited

U.S. PATENT DOCUMENTS 5,018,200 A * 5/1991 Ozawa .................... G10L 19/04
                                                        704/222
5,455,888 A * 10/1995 Iyengar ............... G10L 19/0204
                                                        704/203
(Continued)

FOREIGN PATENT DOCUMENTS

EP    0655731 A2    11/1994
JP    H0683391 A     3/1994
(Continued)

OTHER PUBLICATIONS

Notice of Reasons for Refusal dated Feb. 25, 2020 in Japanese Patent Application No. 2016-175765 (5 pages) (4 pages English Translation).

*Primary Examiner* — Bryan S Blankenagel
(74) *Attorney, Agent, or Firm* — Staas & Halsey LLP

(57) ABSTRACT

A method for utterance section detection includes: executing pitch gain calculation processing that includes calculating a pitch gain indicating an intensity of periodicity of an audio signal expressing a voice of a speaker for each of frames that are obtained by dividing the audio signal and that each have a predetermined length; and executing utterance section detection processing that includes determining that an utterance section on the audio signal starts when the pitch gain becomes greater than or equal to a first threshold value after a non-utterance section on the audio signal lasts, wherein the utterance section detection processing further includes determining that the utterance section ends when the pitch gain becomes less than a second threshold value lower than the first threshold value after the utterance section lasts.

7 Claims, 10 Drawing Sheets

(51) Int. Cl.
*G10L 15/04* (2013.01)
*G10L 19/08* (2013.01)
*G10L 25/90* (2013.01)

(52) U.S. Cl.
CPC .. *G10L 2025/783* (2013.01); *G10L 2025/786* (2013.01); *G10L 2025/906* (2013.01)

(56) References Cited

U.S. PATENT DOCUMENTS

| | | | | |
|---|---|---|---|---|
| 6,275,794 | B1* | 8/2001 | Benyassine | G10L 25/78 |
| | | | | 704/207 |
| 7,013,269 | B1* | 3/2006 | Bhaskar | G10L 19/097 |
| | | | | 704/219 |
| 2002/0165711 | A1* | 11/2002 | Boland | G10L 25/78 |
| | | | | 704/231 |
| 2008/0027715 | A1* | 1/2008 | Rajendran | G10L 19/06 |
| | | | | 704/205 |
| 2008/0082343 | A1* | 4/2008 | Maeda | G10L 19/005 |
| | | | | 704/500 |
| 2008/0228478 | A1* | 9/2008 | Hetherington | G10L 25/87 |
| | | | | 704/233 |
| 2012/0072211 | A1* | 3/2012 | Edgington | G10L 15/04 |
| | | | | 704/231 |
| 2012/0215536 | A1* | 8/2012 | Sehlstedt | G10L 25/78 |
| | | | | 704/246 |
| 2013/0117014 | A1* | 5/2013 | Zhang | G10L 25/90 |
| | | | | 704/207 |
| 2013/0144614 | A1* | 6/2013 | Myllyla | G10L 19/0208 |
| | | | | 704/210 |
| 2017/0110142 | A1* | 4/2017 | Fan | G10L 21/0216 |
| 2018/0158470 | A1* | 6/2018 | Zhu | G10L 25/81 |
| 2019/0156855 | A1* | 5/2019 | Herbig | G10L 25/18 |

FOREIGN PATENT DOCUMENTS

| | | |
|---|---|---|
| JP | H07152395 A | 6/1995 |
| JP | 11-133997 | 5/1999 |
| JP | 2015-4703 A | 1/2015 |

* cited by examiner

APPARATUS, METHOD, AND NON-TRANSITORY COMPUTER-READABLE STORAGE MEDIUM FOR STORING PROGRAM FOR UTTERANCE SECTION DETECTION

CROSS-REFERENCE TO RELATED APPLICATION

This application is based upon and claims the benefit of priority of the prior Japanese Patent Application No. 2016-175765, filed on 8 Sep. 2016, the entire contents of which are incorporated herein by reference.

FIELD

The embodiments discussed herein are related to an apparatus, a method, and a non-transitory computer-readable storage medium for storing a program for utterance section detection, which are each used for detecting, from an audio signal, a section in which a speaker utters, for example.

BACKGROUND

There is developed an application for recognizing, from an audio signal, a phrase uttered by a speaker and translating the recognized phrase into another language or searching on a network or a database with the recognized phrase as a query. In such an application, in order to identify a section in which the speaker utters, the speaker oneself is requested to operate an apparatus into which such an application is implemented, thereby instructing to start recording of an audio signal and to terminate the recording thereof, for example. However, depending on an environment in which such an application is utilized, it is difficult for the speaker to perform such an operation in some cases. In a case where the speaker performs some kind of two-handed work, it is difficult for the speaker to perform an operation for instructing to start recording of an audio signal and to terminate the recording thereof, for example.

On the other hand, a technology for determining whether being silent or voiced in an audio signal is proposed. In this technology, power, a pitch parameter, and so forth of an input audio signal are calculated for each given section of the sound signal. In addition, in a case where the pitch parameter corresponding to a subsequent second given section following a voiced first given section is lower than a predetermined threshold value, the second given section is determined as a silent given section.

Examples of the related art include Japanese Laid-open Patent Publication No. 11-133997.

SUMMARY

According to an aspect of the invention, an apparatus for utterance section detection includes: a memory; and a processor coupled to the memory and configured to execute pitch gain calculation processing that includes calculating a pitch gain indicating an intensity of periodicity of an audio signal expressing a voice of a speaker for each of frames that are obtained by dividing the audio signal and that each have a given length, and execute utterance section detection processing that includes determining that an utterance section starts when the pitch gain becomes greater than or equal to a first threshold value after a non-utterance section on the audio signal lasts, wherein the utterance section detection processing further includes determining that the utterance section ends when the pitch gain becomes less than a second threshold value lower than the first threshold value after the utterance section lasts.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a section in which a speaker utters, a pitch parameter varies in some cases. Therefore, in a related technology for determining, based on a comparison between the pitch parameter and a fixed threshold value, whether or not being voiced, it is difficult to correctly detect, within an audio signal, a section in which the speaker utters, in some cases.

In one aspect, an object of the present technology is to provide an utterance section detection apparatus capable of detecting, within an audio signal, a section in which a speaker utters.

Hereinafter, an utterance section detection apparatus based on an embodiment will be described with reference to drawings.

Due to characteristics of a human voice, some degree of periodicity is recognized in a section (hereinafter, simply called an utterance section) that is included in an audio signal and in which a speaker utters. Therefore, this utterance section detection apparatus detects the utterance section, based on a pitch gain indicating an intensity of the periodicity of a sound. For this reason, this utterance section detection apparatus is able to more correctly detect the utterance section, compared with a case of utilizing power or a signal-to-noise ratio, which may have a great value in other than the voice of the speaker.

Here, it is known that, in a case where a speaker continuously vocalizes, an expiratory pressure of the speaker is decreases toward an end of a word and the periodicity of glottal closure is reduced in intensity (see, for example, Uemura Yukio, "Air stream, Air pressure, and Articulatory Phonetics", *Humanities* 6, pp. 247-291, 2007). For this reason, the inventor focuses on it that the pitch gain is attenuated toward an end of a word in an utterance section. Therefore, this utterance section detection apparatus sets a second threshold value lower than a first threshold value, the second threshold value being used for the pitch gain and being used at a time of detecting an end of an utterance section, the first threshold value being used for the pitch gain and being used at a time of detecting a start of the utterance section.

Note that this utterance section detection apparatus is able to be implemented into various apparatuses that each adopt a user interface utilizing sound recognition, the various apparatuses including a navigation system, a mobile phone, a computer, and so forth, for example.

Figure 1:
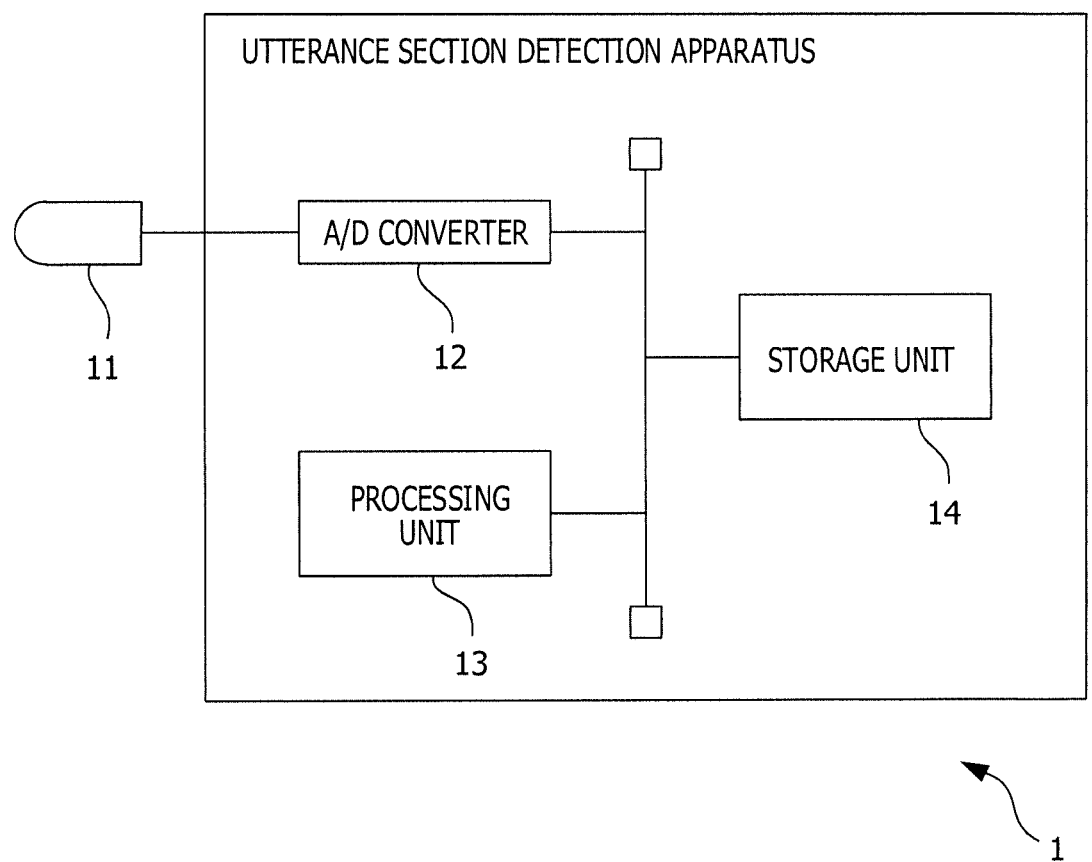
FIG. 1 is a schematic configuration diagram of an utterance section detection apparatus based on an embodiment.

FIG. 1 is a schematic configuration diagram of an utterance section detection apparatus based on an embodiment. An utterance section detection apparatus 1 includes a microphone 11, an analog-to-digital converter 12, a processing unit 13, and a storage unit 14. Note that the utterance section detection apparatus 1 may further include a speaker (not graphically illustrated), a display apparatus (not graphically illustrated), and a communication interface (not graphically illustrated) for communicating with another apparatus.

The microphone 11 is an example of a sound input unit and collects an ambient sound of the utterance section detection apparatus 1, which includes a voice of a speaker, thereby generating an analog audio signal corresponding to the intensity of the sound. In addition, the microphone 11 outputs that analog audio signal to the analog-to-digital converter 12 (hereinafter, expressed as an AD converter). The AD converter 12 samples the analog audio signal at a predetermined sampling rate, thereby digitalizing that audio signal. Note that the sampling rate is set to, for examples, 16 kHz to 32 kHz so that a frequency band desired for analyzing the voice of the speaker from the audio signal becomes less than or equal to a Nyquist frequency, for example. In addition, the AD converter 12 outputs the digitalized audio signal to the processing unit 13. Note that, in what follows, the digitalized audio signal is simply called an audio signal.

The processing unit 13 includes one or more processors, a readable and writable memory circuit, and peripheral circuits thereof, for example. In addition, the processing unit 13 performs utterance section detection processing on the audio signal, thereby detecting an utterance section. The processing unit 13 performs, for example, sound recognition processing on the audio signal within the utterance section, thereby recognizing a phrase uttered by the speaker. Furthermore, the processing unit 13 performs processing that corresponds to the recognize phrase and examples of which include translation of the recognized phrase to a phrase of a preliminarily set language and search processing on a network or the like with the recognized phrase as a query. Note that details of the utterance section detection processing will be described later.

The storage unit 14 includes a readable and writable non-volatile semiconductor memory, and a readable and writable volatile semiconductor memory, for example. Furthermore, the storage unit 14 may include a magnetic recording medium or an optical recording medium and an access apparatus therefor. In addition, the storage unit 14 stores therein various kinds of data used by the utterance section detection processing executed on the processing unit 13 and various kinds of data generated in the middle of the utterance section detection processing. The storage unit 14 stores therein a threshold value for the pitch gain, for example. Furthermore, the storage unit 14 may store therein a program related to processing to be performed on the audio signal within the utterance section and various kinds of data to be used by that program.

Hereinafter, details of the processing unit 13 will be described.

Figure 2:
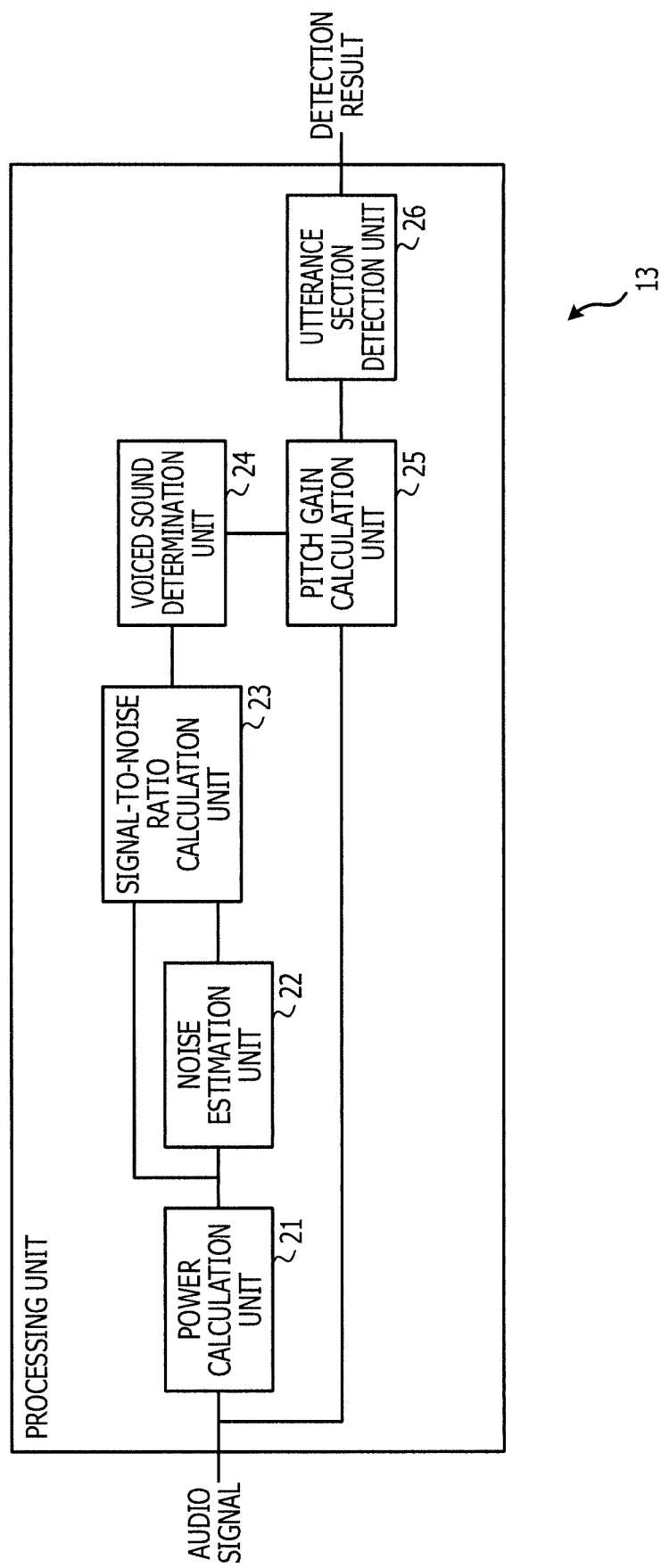
FIG. 2 is a functional block diagram of a processing unit related to utterance section detection processing.

FIG. 2 is a functional block diagram of the processing unit 13 related to the utterance section detection processing. The processing unit 13 includes a power calculation unit 21, a noise estimation unit 22, a signal-to-noise ratio calculation unit 23, a voiced sound determination unit 24, a pitch gain calculation unit 25, and an utterance section detection unit 26.

Each of the units included in the processing unit 13 is a functional module realized by a computer program that operates on a processor included in the processing unit 13, for example. Alternatively, each of the units included in the processing unit 13 may be one or more integrated circuits that realize a function of the relevant unit. In addition, the processing unit 13 performs the utterance section detection processing on the audio signal while defining, as a unit of processing, a frame having a predetermined length. The frame length is set to 10 msec to 20 msec, for example. Therefore, the processing unit 13 divides the audio signal into individual frames and inputs the individual frames to the power calculation unit 21 and the pitch gain calculation unit 25.

Every time a frame is input, the power calculation unit 21 calculates the power of the audio signal for that frame. For each frame, the power calculation unit 21 calculates power in accordance with the following Expression, for example.

$$Spow(k) = \sum_{n=0}^{N-1} s_k(n)^2$$

Here, Sk(n) indicates a signal value of an n-th sampling point of a latest frame (also called a current frame). "k" is a frame number. In addition, "N" indicates the total number of sampling points included in one frame. In addition, Spow(k) indicates the power of the current frame.

Note that, for each frame, the power calculation unit 21 may calculate power for each of frequencies. In this case, for each frame, the power calculation unit 21 transforms the audio signal from a time domain into spectrum signals in a frequency domain by using time-frequency transform. Note that the power calculation unit 21 may use, as the time-frequency transform, fast Fourier transform (FFT), for example. In addition, for each frequency band, the power calculation unit 21 may calculate, as the power of the relevant frequency band, the sum of squares of spectrum signals included in the relevant frequency band.

The power calculation unit 21 outputs the power of each frame to the noise estimation unit 22 and the signal-to-noise ratio calculation unit 23.

For each frame, the noise estimation unit 22 calculates an estimated noise component within the audio signal in the relevant frame. In the present embodiment, by using the power of the current frame, the noise estimation unit 22 updates the estimated noise component in an immediately preceding frame in accordance with the following Expression, thereby calculating the estimated noise component of the current frame.

$$Noise(k) = \beta \cdot Noise(k-1) + (1-\beta) \cdot Spow(k)$$

Here, Noise(k−1) indicates the estimated noise component in the immediately preceding frame, and Noise(k) indicates the estimated noise component in the current frame. In addition, β is a forgetting factor and is set to 0.9, for example.

Note that, in a case where power is calculated for each frequency band, the noise estimation unit 22 may calculate, in accordance with Expression (2), an estimated noise component for each frequency band. In this case, in Expression (2), Noise(k−1), Noise(k), and Spow(k) are the estimated noise component of the immediately preceding frame and the estimated noise component and the power of the current frame, respectively, for a frequency band on which attention is focused.

The noise estimation unit 22 outputs the estimated noise component of each frame to the signal-to-noise ratio calculation unit 23.

Note that, in a case where the voiced sound determination unit 24 to be described later determines that the current frame is a voiced sound frame including some kind of signal component, the noise estimation unit 22 may substitute the estimated noise component Noise(k) of the current frame with Noise(k−1). For this reason, the noise estimation unit 22 is able to estimate a noise component, based on a frame estimated to only include a noise component and to include no signal component. Accordingly, it is possible to improve the accuracy of estimation of the noise component.

Alternatively, only in a case where the power of the current frame is less than or equal to a predetermined threshold value, the noise estimation unit 22 only has to update the estimated noise component in accordance with Expression (2). In addition, in a case where the power of the current frame is greater than the predetermined threshold value, the noise estimation unit 22 only has to define Noise(k)=Noise(k−1). Note that the predetermined threshold value may be set to a value obtained by adding a predetermined offset value to Noise(k−1), for example.

The signal-to-noise ratio calculation unit 23 calculates a signal-to-noise ratio (hereinafter, simply expressed as an SN ratio) for each frame. The signal-to-noise ratio calculation unit 23 calculates the SN ratio in accordance with the following Expression, for example.

$$SNR(k) = 10 \cdot \log_{10} \frac{Spow(k)}{Noise(k)}$$

Here, SNR(k) indicates the SN ratio of the current frame. Note that, in a case where power and an estimated noise component are calculated for each frequency band, the signal-to-noise ratio calculation unit 23 may calculate the SN ratio for each frequency band in accordance with Expression (3). In this case, in Expression (3), Noise(k), Spow(k), and SNR(k) are the estimated noise component, the power, and the SN ratio of the current frame, respectively, for a frequency band on which attention is focused.

The signal-to-noise ratio calculation unit 23 outputs the SN ratio of each frame to the voiced sound determination unit 24.

For each frame, the voiced sound determination unit 24 determines, based on the SN ratio of the relevant frame, whether or not the relevant frame is included in a voiced sound section. Note that the voiced sound section is a section for which it is estimated that some sort of signal component is included in an audio signal within the relevant section. Therefore, it is assumed that an utterance section is included in the voiced sound section. Therefore, by identifying the voiced sound section as a section to serve as a detection target for the utterance section, it is possible for the utterance section detection apparatus 1 to improve the detection accuracy of the utterance section.

In the present embodiment, for each frame, the voiced sound determination unit 24 compares the SN ratio of the relevant frame with a voiced sound determination threshold value Thsnr. Note that the voiced sound determination threshold value Thsnr is set to a value, for example, 2 to 3, which is equivalent to it that a signal component other than the estimated noise component is included in the audio signal, for example. In addition, in a case where the SN ratio is greater than or equal to the voiced sound determination threshold value Thsnr, the voiced sound determination unit 24 determines that the relevant frame is included in the voiced sound section. On the other hand, in a case where the SN ratio is less than the voiced sound determination threshold value Thsnr, the voiced sound determination unit 24 determines that the relevant frame is not included in the voiced sound section, in other words, the relevant frame is included in a silent section. Note that, at a point of time when frames the SN ratios of which are each greater than or equal to the voiced sound determination threshold value Thsnr continue for a given period of time (one second, for example), the voiced sound determination unit 24 may determine as being put into the voiced sound section. In addition, at a point of time when consecutive frames the SN ratios of which are each less than the voiced sound determination threshold value Thsnr occur for a given period of time in a state of being determined that frames previous thereto are included in the voiced sound section, the voiced sound determination unit 24 may determine that the voiced sound section is terminated.

Furthermore, in a case where the SN ratio is calculated for each frequency band, if the number of frequency bands the SN ratios of which are each greater than or equal to the voiced sound determination threshold value Thsnr is greater than or equal to a predetermined number, the voiced sound determination unit 24 may determine that a corresponding frame is included in the voiced sound section. Note that the predetermined number may be set to a half of the total number of frequency bands for each of which the SN ratio is calculated, for example. Alternatively, in a case where the SN ratio is greater than or equal to the voiced sound determination threshold value Thsnr for each of frequency bands each including a frequency serving as an analysis target, the voiced sound determination unit 24 may determine that a corresponding frame is included in the voiced sound section.

Alternatively, based on the power itself of each frame, the voiced sound determination unit 24 may determine whether or not the relevant frame is included in the voiced sound section. In this case, if the power of the current frame is greater than or equal to a predetermined threshold value, the voiced sound determination unit 24 may determine that the current frame is included in the voiced sound section, and if the power of the current frame is less than the predetermined threshold value, the voiced sound determination unit 24 may determine that the current frame is included in the silent section. In this case, the predetermined threshold value may be set to a value that increases with an increase in the estimated noise component of the current frame.

For each frame, the voiced sound determination unit 24 notifies the noise estimation unit 22 and the pitch gain calculation unit 25 of information indicating a result of determination of whether or not the relevant frame is included in the voiced sound section. Note that the information indicating a result of determination of whether or not being included in the voiced sound section may be defined as a flag that is set to "1" in a case of the voiced sound section and that is set to "0" in a case of the silent section.

Note that, in a case where, before the utterance section detection unit 26 detects an end of the utterance section after detecting a start of the utterance section, the voiced sound determination unit 24 determines that the current frame belongs to the silent section, the voiced sound determination unit 24 may determine that the utterance section comes to an end with an immediately preceding frame.

For each frame included in the voiced sound section, the pitch gain calculation unit 25 calculates a pitch gain indicating an intensity of the periodicity of a sound. Note that the pitch gain is also called a pitch prediction gain. Since the pitch gain calculation unit 25 performs the same processing for each frame included in the voiced sound section, processing for one frame will be described hereinafter.

In order to calculate the pitch gain, first the pitch gain calculation unit 25 calculates a long-term autocorrelation C(d) of an audio signal for delay amounts d∈{dlow, . . . , dhigh}.

$$C(d) = \sum_{n=0}^{N-1} s_k(n) \cdot s_k(n-d) \quad (d = d_{low}, \ldots, d_{high})$$

As described above, Sk(n) is the n-th signal value of a current frame k. In addition, "N" indicates the total number of sampling points included in the frame. Note that, in a case where (n−d) is negative, a corresponding signal value (in other words, Sk−1(N−(n−d))) of an immediately preceding frame is used as Sk(n−d). In addition, the range of the delay amounts d {dlow, . . . , dhigh} is set so as to include a delay amount equivalent to a fundamental frequency (100 to 300 Hz) of a human voice. The reason is that the pitch gain becomes highest at the fundamental frequency. In a case where a sampling rate is 16 kHz, dlow=40 and dhigh=286 are set, for example.

After calculating the long-term autocorrelation C(d) for each of the delay amounts d included in the range of the delay amounts, the pitch gain calculation unit 25 obtains a maximum value C(dmax) from among the long-term autocorrelations C(d). Note that dmax is a delay amount corresponding to the maximum value C(dmax) out of the long-term autocorrelations C(d) and the delay amount is equivalent to a pitch period. In addition, the pitch gain calculation unit 25 calculates a pitch gain gpitch in accordance with the following Expression.

$$g_{pitch} = \frac{C(d_{max})}{\sum_{n=0}^{N-1} s_k(n) \cdot s_k(n)}$$

Every time the pitch gain calculation unit 25 calculates the pitch gain gpitch for a frame within the voiced sound section, the pitch gain calculation unit 25 outputs the pitch gain gpitch to the utterance section detection unit 26.

For each frame within the voiced sound section, the utterance section detection unit 26 compares the pitch gain gpitch with a threshold value for utterance section detection, thereby detecting an utterance section. In other words, if the pitch gain gpitch becomes greater than or equal to a first threshold value in a case where a non-utterance section in which a speaker does not utter lasts, the utterance section detection unit 26 determines that an utterance section in which the speaker utters is started. On the other hand, if the pitch gain gpitch becomes less than a second threshold value lower than the first threshold value in a case where the utterance section lasts, the utterance section detection unit 26 determines that the utterance section ends.

In the present embodiment, in a case where a frame immediately preceding the current frame is not the utterance section, the utterance section detection unit 26 compares, with the pitch gain, the relatively high first threshold value for detecting a start of the utterance section. Note that a flag that is stored in the storage unit 14 and that indicates whether or not being the utterance section is referenced, for example, thereby determining whether or not the immediately preceding frame is included in the utterance section. In addition, in a case where the pitch gain is greater than or equal to the first threshold value, the utterance section detection unit 26 determines that the utterance section is started from the current frame. In addition, the utterance section detection unit 26 updates the flag indicating whether or not being the utterance section, to a value ("1", for example) indicating being the utterance section.

On the other hand, in a case where the frame immediately preceding the current frame is included in the utterance section, the pitch gain is compared with the relatively low second threshold value for detecting an end of the utterance section. In addition, in a case where the pitch gain is less than the second threshold value, the utterance section detection unit 26 determines that the utterance section comes to an end with the immediately preceding frame. In addition, the utterance section detection unit 26 updates the flag indicating whether or not being the utterance section, to a value ("0", for example) indicating being the non-utterance section.

Figure 3:
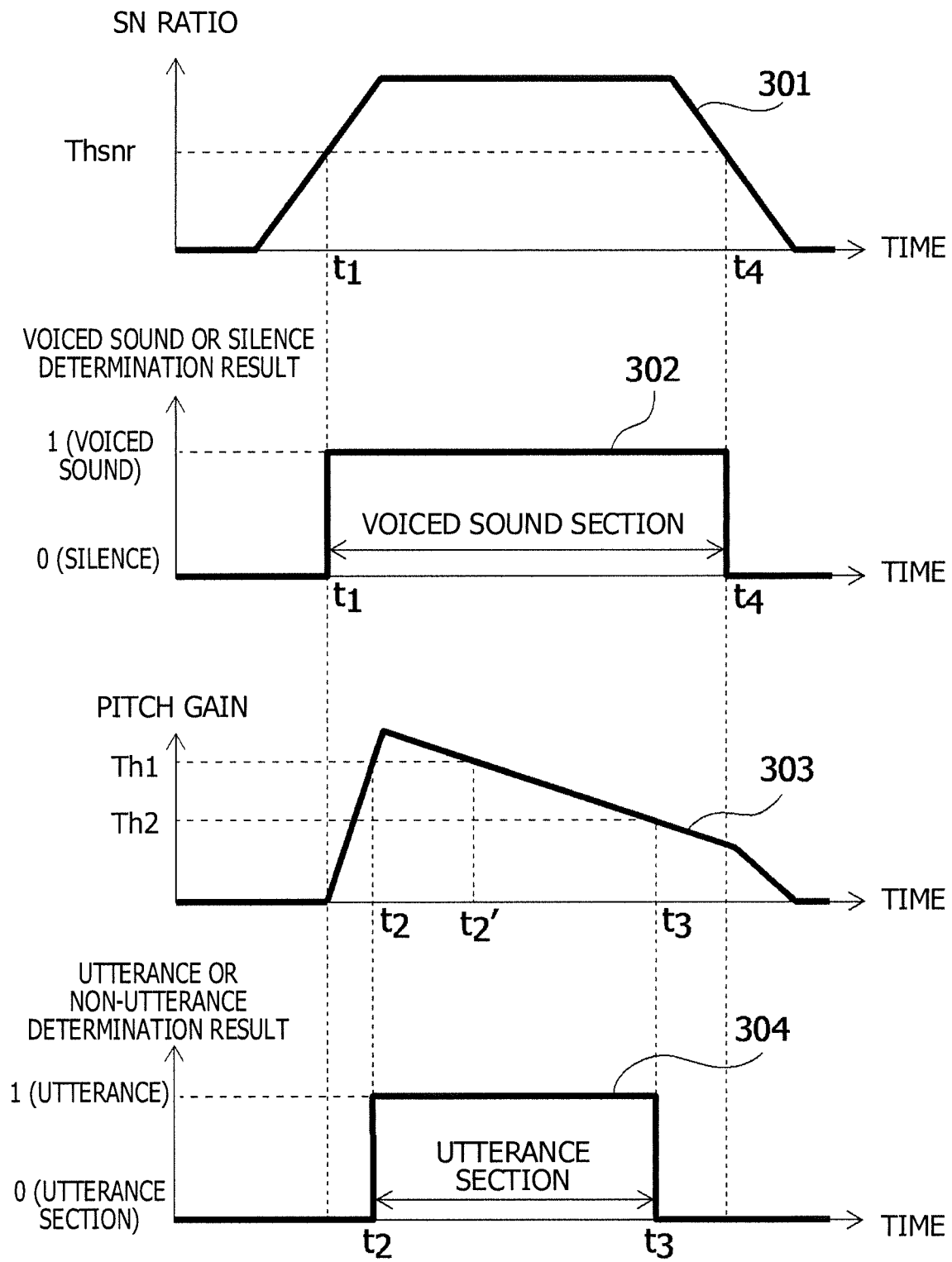
FIG. 3 is a diagram for explaining an outline of the utterance section detection processing.

FIG. 3 is a diagram for explaining an outline of the utterance section detection processing based on the present embodiment. In each of graphs in FIG. 3, a horizontal axis indicates a time. In the topmost graph, a vertical axis indicates an SN ratio. In the second graph from the top, a vertical axis indicates a result of determination of whether being a voiced sound section or a silent section. In addition, the third graph from the top, a vertical axis indicates a pitch gain. In addition, the bottommost graph, a vertical axis indicates a result of determination of whether or not being an utterance section.

In the topmost graph, a polygonal line 301 indicates a temporal change in the SN ratio. In the second graph from the top, a polygonal line 302 indicates a result of determination of whether being the utterance section or the silent section for each time. As illustrated by the polygonal line 301, the SN ratio becomes greater than or equal to the voiced sound determination threshold value Thsnr at a time t1, and after that, the SN ratio is continuously greater than or equal to the voiced sound determination threshold value Thsnr until a time t4. After the time t4, the SN ratio becomes less than the voiced sound determination threshold value Thsnr. As a result, as illustrated by the polygonal line 302, a section from the time t1 to the time t4 is determined as the voiced sound section, and sections before and after that are determined as the silent sections.

In the third graph from the top, a polygonal line 303 indicates a temporal change in the pitch gain. In addition, in the bottommost graph, a polygonal line 304 indicates a result of determination of whether or not being the utterance section for each time. As illustrated by the polygonal line 303, the pitch gain starts increasing from the time t1 and becomes greater than or equal to a first threshold value Th1 at a time t2. After a while after that, the pitch gain peaks and gradually attenuates after that. In addition, at a time t3, the pitch gain becomes less than a second threshold value Th2 lower than the first threshold value Th1. As a result, as illustrated by the polygonal line 304, a section from the time t2 to the time t3 is determined as the utterance section. Note that since the pitch gain becomes less than the threshold value Th1 at a time t2' if the threshold value Th1 is used for determination of an end of the utterance section, only a section shorter than the original utterance section turns out to be detected as an utterance section. However, as described above, the threshold value Th2 used for determining an end of the utterance section is set to a level lower than the threshold value Th1 used for determining a start of the utterance section, thereby enabling the utterance section detection unit 26 to adequately detect the utterance section.

The utterance section detection unit 26 outputs, to the processing unit 13, a timing at which the utterance section is started and a timing at which the utterance section ends.

In a case where the utterance section is detected, in order to recognize a content uttered by a speaker within, for example, the utterance section, the processing unit 13 extracts, from each frame within the utterance section, feature amounts indicating respective features of the voice of the speaker. As such feature amounts, coefficients of predetermined orders of a Mel frequency cepstrum are used, for example. In addition, the processing unit 13 applies the feature amounts of individual frames to, for example, an acoustic model by using a hidden Markov model, thereby recognizing a phoneme sequence within the utterance section. In addition, the processing unit 13 references a word dictionary indicating a phoneme sequence for each word and detects a combination of words coincident with the phoneme sequence within the utterance section, thereby recognizing an utterance content within the utterance section. Furthermore, the processing unit 13 may perform processing that corresponds to that utterance content and that corresponds to an application executed by the processing unit 13. The processing unit 13 may perform automatic translation processing on the combination of words corresponding to the utterance content, thereby translating the utterance content to another language, for example. In addition, the processing unit 13 may display, on a display apparatus (not graphically illustrated), a character string corresponding to the utterance content translated to the other language. Alternatively, the processing unit 13 may apply voice synthesis processing to the translated character string and may generate a synthesized voice signal expressing that character string, thereby reproducing that synthesized voice signal via a speaker (not graphically illustrated). Alternatively, the processing unit 13 may perform search processing on a network coupled to the utterance section detection apparatus 1 while using, as a query, the combination of words corresponding to the utterance content. Alternatively, the processing unit 13 may compare the character string expressing the utterance content with operation commands of an apparatus into which the utterance section detection apparatus 1 is implemented, and may perform processing corresponding to one of the operation commands in a case where the character string expressing the utterance content is coincident with the corresponding operation command.

Figure 4:
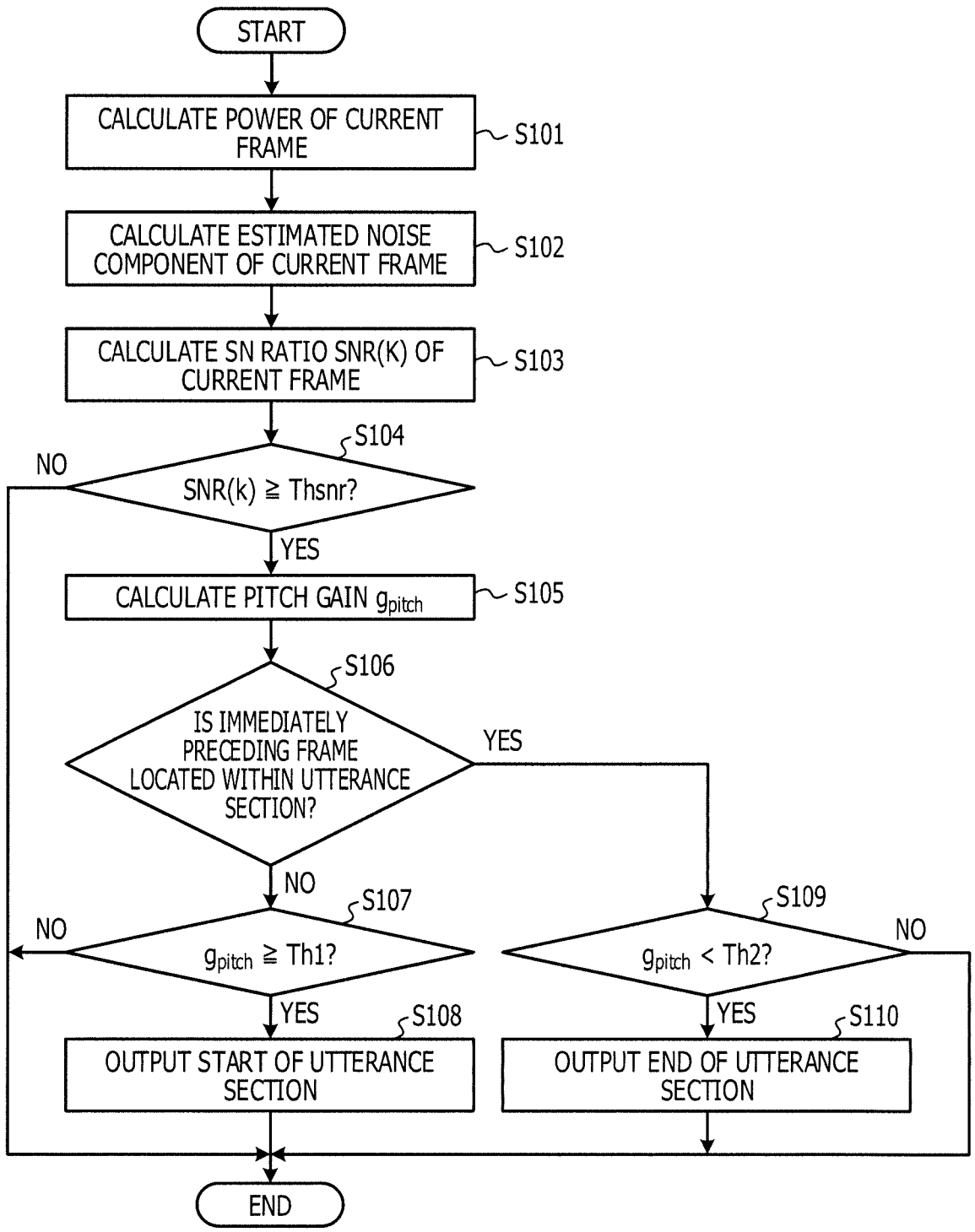
FIG. 4 is an operational flowchart of the utterance section detection processing.

FIG. 4 is an operational flowchart of the utterance section detection processing based on the present embodiment. For each frame, the processing unit 13 performs the utterance section detection processing in accordance with an operational flowchart described below.

The power calculation unit 21 calculates the power of a current frame of an audio signal (step S101). Based on the power of the current frame and an estimated noise component in an immediately preceding frame, the noise estimation unit 22 calculates an estimated noise component of the current frame (step S102). In addition, based on the power and the estimated noise component of the current frame, the signal-to-noise ratio calculation unit 23 calculates the SN ratio SNR(k) of the current frame (step S103).

The voiced sound determination unit 24 determines whether or not the SN ratio SNR(k) of the current frame is greater than or equal to the voiced sound determination threshold value Thsnr (step S104). In a case where the SN ratio SNR(k) of the current frame is less than the voiced sound determination threshold value Thsnr (step S104: No), the voiced sound determination unit 24 determines that the current frame is not included in a voiced sound section. In addition, the processing unit 13 terminates the utterance section detection processing.

On the other hand, in a case where the SN ratio of the current frame is greater than or equal to the voiced sound determination threshold value Thsnr (step S104: Yes), the voiced sound determination unit 24 determines that the current frame is included in the voiced sound section. In addition, the pitch gain calculation unit 25 calculates the pitch gain gpitch of the current frame (step S105).

The utterance section detection unit 26 determines whether or not the immediately preceding frame is included in an utterance section (step S106). In a case where the immediately preceding frame is not included in the utterance section (step S106: No), the utterance section detection unit 26 determines whether or not the pitch gain gpitch of the current frame is greater than or equal to the relatively high first threshold value Th1 (step S107). In a case where the pitch gain gpitch of the current frame is greater than or equal to the first threshold value Th1 (step S107: Yes), the utterance section detection unit 26 determines that the utterance section starts from the current frame, and the utterance section detection unit 26 outputs information indicating that the utterance section starts (step S108). In addition, the utterance section detection unit 26 updates a flag indicating whether or not being the utterance section, to a value indicating being the utterance section.

On the other hand, in a case where the pitch gain gpitch of the current frame is less than the first threshold value Th1 (step S107: No), the utterance section detection unit 26 determines that the current frame is not included in the utterance section. In addition, the processing unit 13 terminates the utterance section detection processing.

In addition, in a case where, in step S106, the immediately preceding frame is included in the utterance section (step S106: Yes), the utterance section detection unit 26 determines whether or not the pitch gain gpitch of the current frame is less than the relatively low second threshold value Th2 (step S109). In a case where the pitch gain gpitch of the current frame is less than the second threshold value Th2 (step S109: Yes), the utterance section detection unit 26 determines that the utterance section comes to an end with the immediately preceding frame, and the utterance section detection unit 26 outputs information indicating that the utterance section ends (step S110). In addition, the utterance section detection unit 26 updates a flag indicating whether or not being the utterance section, to a value indicating being a non-utterance section.

On the other hand, in a case where the pitch gain gpitch of the current frame is greater than or equal to the second threshold value Th2 (step S109: No), the utterance section detection unit 26 determines that the utterance section lasts in the current frame. In addition, the processing unit 13 terminates the utterance section detection processing.

As described above, this utterance section detection apparatus sets a threshold value for the pitch gain to a level lower than anther threshold value for the pitch gain, the former threshold value being used at a time of detecting an end of the utterance section, the other threshold value being used at a time of detecting a start of the utterance section. Therefore, even in a case where the pitch gain is reduced in accordance with the continuation of utterance, this utterance section detection apparatus is able to adequately detect the utterance section.

Note that, according to an example of a modification, the utterance section detection unit 26 may adjust the second threshold value Th2, based on the pitch gain at a time of a start of the utterance section. As illustrated in the following Expression, the utterance section detection unit 26 may define, as a second threshold value Th2' after the adjustment, a value obtained by multiplying the second threshold value Th2 by a ratio of the pitch gain gpitch (tstart) at a start of the utterance section to the first threshold value Th1, for example. In other words, the second threshold value Th2' after the adjustment increases with an increase in the pitch gain at a time of a start of the utterance section.

$$Th2' = \frac{g_{pitch}(t_{start})}{Th1} \cdot Th2$$

In this case, when the pitch gain becomes less than the second threshold value Th2' after the adjustment, the utterance section detection unit 26 only has to determine that the utterance section ends.

Figure 5:
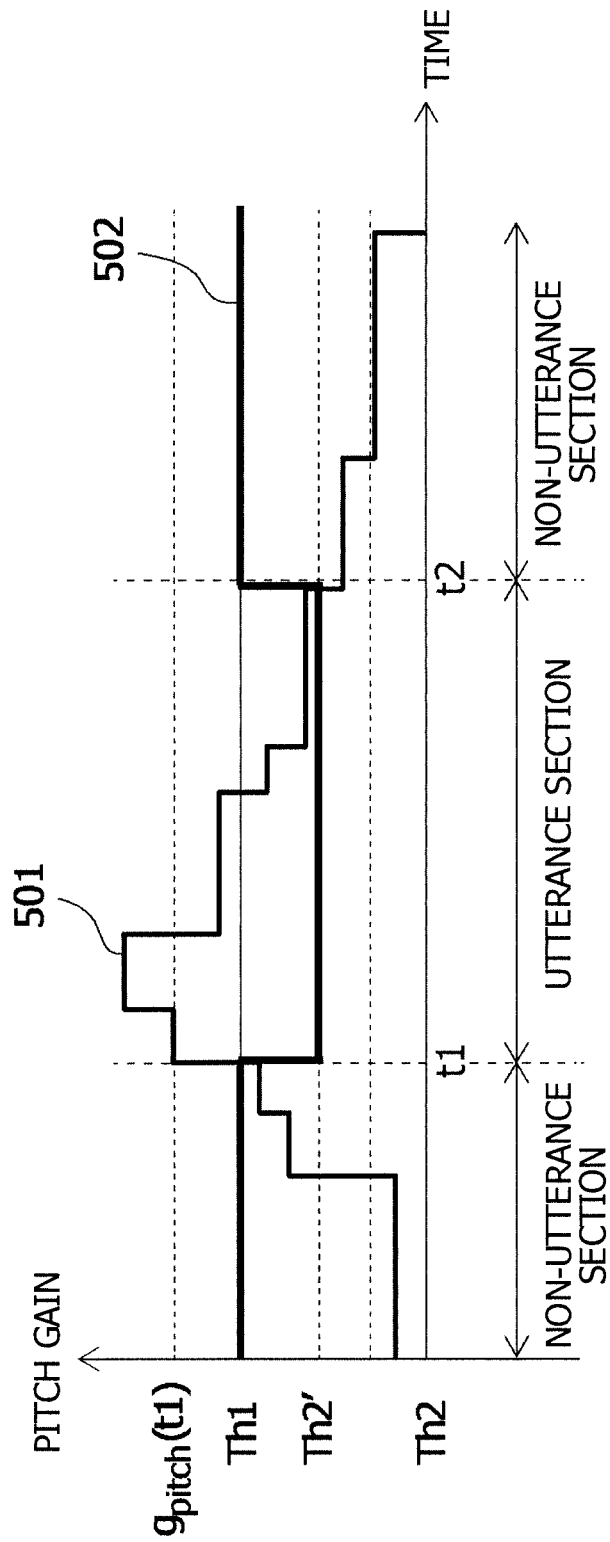
FIG. 5 is a diagram illustrating a relationship between an utterance section and threshold values, which is based on an example of a modification.

FIG. 5 is a diagram illustrating a relationship between an utterance section and threshold values, which is based on this example of a modification. In FIG. 5, a horizontal axis indicates a time, and a vertical axis indicates a pitch gain. A polygonal line 501 indicates a temporal change in the pitch gain. In addition, a polygonal line 502 indicates a temporal change in a threshold value used for detecting the utterance section. In this example, at a time t1, the pitch gain gpitch (t1) becomes greater than or equal to the first threshold value Th1 for the first time. Therefore, at the time t1, it is determined that the utterance section starts. In addition, the adjusted second threshold value Th2' is calculated based on a ratio (gpitch(t1)/Th1). After that, at a time t2, the pitch gain gpitch(t2) becomes less than the adjusted second threshold value Th2'. Therefore, at the time t2, it is determined that the utterance section ends.

According to this example of a modification, the second threshold value is adjusted based on the pitch gain at a time of a start of the utterance section. Therefore, the utterance section detection unit 26 is able to adequately adjust the second threshold value in accordance with features of the vice of the speaker. As a result, the utterance section detection unit 26 is able to more adequately detect the utterance section.

In addition, according to another example of a modification, the utterance section detection unit 26 may adjust the first threshold value Th1 and the second threshold value Th2, based on the SN ratio of the audio signal.

In general, a ratio of a noise component included in the audio signal increases with a decrease in the SN ratio. Accordingly, the periodicity of the audio signal is reduced. Therefore, according to this example of a modification, the utterance section detection unit 26 sets the first threshold value Th1 and the second threshold value Th2 to respective levels that decrease with a decrease in the SN ratio of the current frame.

Figure 6:
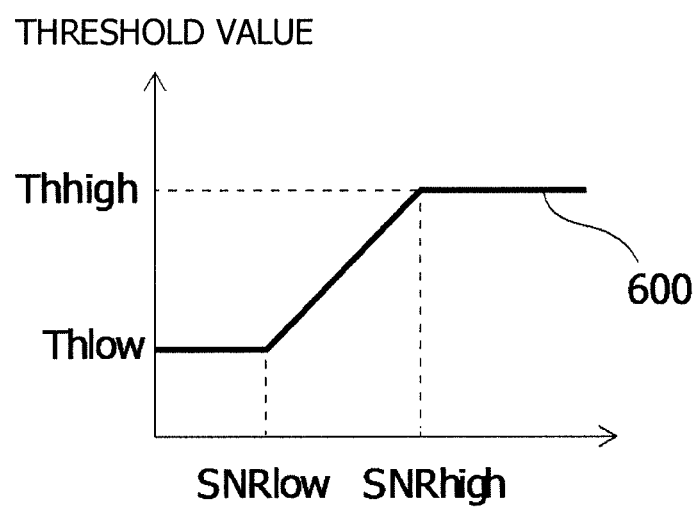
FIG. 6 is a diagram illustrating an example of a relationship between an SN ratio and a first threshold value.

FIG. 6 is a diagram illustrating an example of a relationship between an SN ratio and a first threshold value. In FIG. 6, a horizontal axis indicates the SN ratio, and a vertical axis indicates the first threshold value. In addition, a polygonal line 600 indicates a relationship between the SN ratio and the first threshold value. As illustrated by the polygonal line 600, in a case where the SN ratio is less than or equal to SNRlow, the first threshold value is set to Thlow. In addition, in a case where the SN ratio is greater than SNRlow and is less than SNRhigh, the first threshold value linearly increases with an increase in the SN ratio. In addition, in a case where the SN ratio becomes greater than or equal to SNRhigh, the first threshold value is set to Thhigh. Note that SNRlow and SNRhigh are set to 18 dB and 30 dB, respectively, for example. In addition, Thlow and Thhigh are set to 0.5 and 0.7, respectively, for example. In the same way, the second threshold value Th2 only has to be set so as to linearly increase with an increase in the SN ratio in a case where the SN ratio is greater than SNRlow and is less than SNRhigh. In addition, the second threshold value in a case where the SN ratio is less than or equal to SNRlow is set to 0.4, for example, and the second threshold value in a case where the SN ratio is greater than or equal to SNRhigh is set to 0.6, for example. Note that a reference table indicating a relationship between the SN ratio and the first and second threshold values as illustrated in FIG. 6 may be preliminarily stored in the storage unit 14 and the utterance section detection unit 26 only has to set the values of the first and second threshold values corresponding to the SN ratio by referencing that reference table.

According to this example of a modification, in accordance with the SN ratio of the audio signal, the utterance section detection unit 26 is able to adequately set the first and second threshold values for the pitch gain used for detecting the utterance section. Note that, in order to suppress sharp fluctuations in the respective first and second threshold values for the pitch gain in units of frames, the utterance section detection unit 26 may determine, in accordance with the relationship illustrated in FIG. 6, the first and second threshold values in response to the SN ratio of a frame at a time of a start of the voiced sound section.

In addition, adjustments of the first and second threshold values, based on the SN ratio, and an adjustment of the second threshold value, based on the pitch gain, may be combined. In this case, the utterance section detection unit 26 only has to define the first and second threshold values determined based on the SN ratio as the threshold value Th1 and the threshold value Th2 in Expression (6), thereby calculating the threshold value Th2' after an adjustment, for example.

In addition, in an environment containing loud noises, an error included in a calculated value of the pitch gain becomes relatively high due to the influence of a noise, in some cases. Therefore, even in a case where the utterance section does not end, the pitch gain instantaneously becomes less than the second threshold value in some cases.

Therefore, according to yet another example of a modification, in a case where, after a start of the utterance section, the pitch gain continues being less than the second threshold value over a given monitoring section, the utterance section detection unit 26 may determine that the utterance section ends. Note that, according to an experiment based on the inventor, in an environment containing a relatively low noise (the SN ratio is 30 dB, for example), the value of the pitch gain continued being greater than or equal to 0.6 within an utterance section. On the other hand, in other than the utterance section, the pitch gain did not last for one or more seconds. From this, the above-mentioned monitoring section is set to one second, for example.

Figure 7:
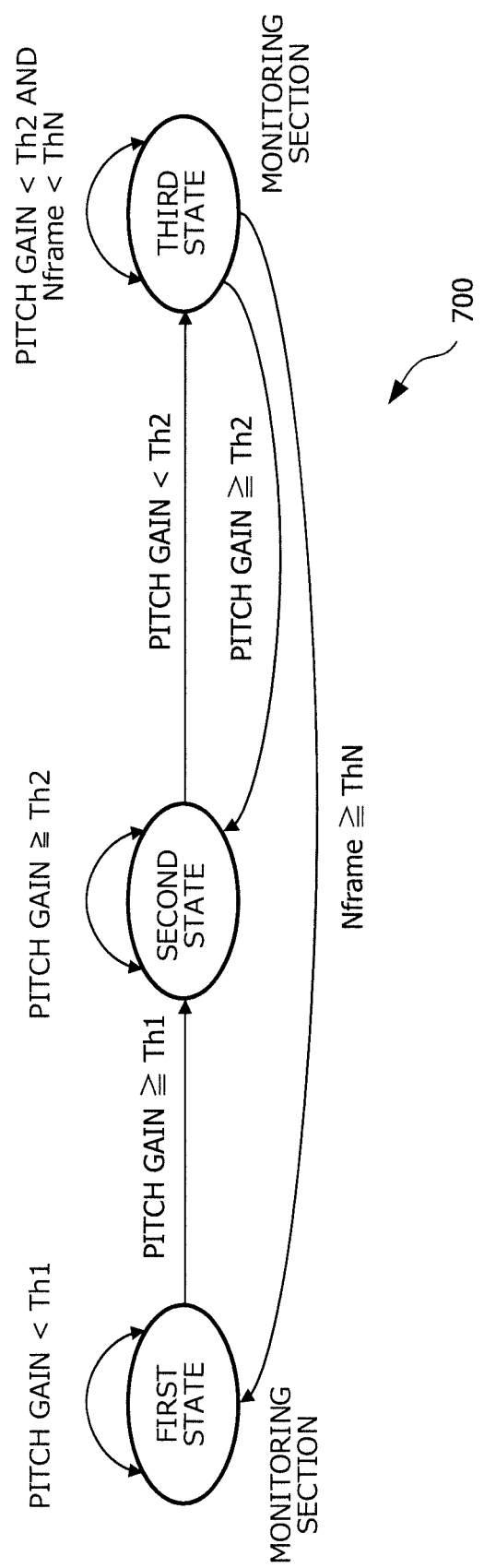
FIG. 7 is a state transition diagram related to determination of an utterance section and based on an example of a modification.

FIG. 7 is a state transition diagram related to determination of an utterance section and based on this example of a modification. In a state transition diagram 700, a first state to a third state indicate respective detected states of utterance sections, different from one another. Specifically, the first state indicates that an immediately preceding frame is not located within an utterance section or a monitoring section, in other words, is located within a non-utterance section. In addition, the second state indicates that the immediately preceding frame is located within the utterance section. In addition, the third state indicates that the immediately preceding frame is located within the monitoring section.

In a case where the pitch gain of a current frame is less than the first threshold value Th1 in the first state, the detected state of the utterance section does not change. In other words, the current frame is included in the non-utterance section. On the other hand, in a case where the pitch gain of the current frame is greater than or equal to the first threshold value Th1 in the first state, the detected state of the utterance section makes a transition from the first state to the second state. In other words, the utterance section starts from the current frame.

In a case where the pitch gain of the current frame is greater than or equal to the second threshold value Th2 lower than the first threshold value Th1 in the second state, the detected state of the utterance section does not change. In other words, the current frame is included in the utterance section. On the other hand, in a case where the pitch gain of the current frame is less than the second threshold value Th2 in the second state, the detected state of the utterance section makes a transition from the second state to the third state. In other words, the monitoring section starts from the current frame.

In a case where the pitch gain of the current frame becomes greater than or equal to the second threshold value Th2 in the third state, the detected state of the utterance section makes a transition from the third state to the second state. In other words, it is determined that the utterance section lasts until the current frame, and the monitoring section ends once. On the other hand, in a case where the pitch gain of the current frame is less than the second threshold value Th2 and a duration time (the number of frames corresponding to that duration time is represented as Nframe) from a start of the monitoring section does not reach a given period of time (a threshold value ThN), the detected state of the utterance section does not change. In other words, the current frame is included in the monitoring section. In addition, in a case where the pitch gain of the current frame is less than the second threshold value Th2 and the duration time from a start of the monitoring section reaches the given period of time, the detected state of the utterance section makes a transition from the third state to the first state. In other words, it is determined that the utterance section comes to an end with the current frame.

Figure 8:
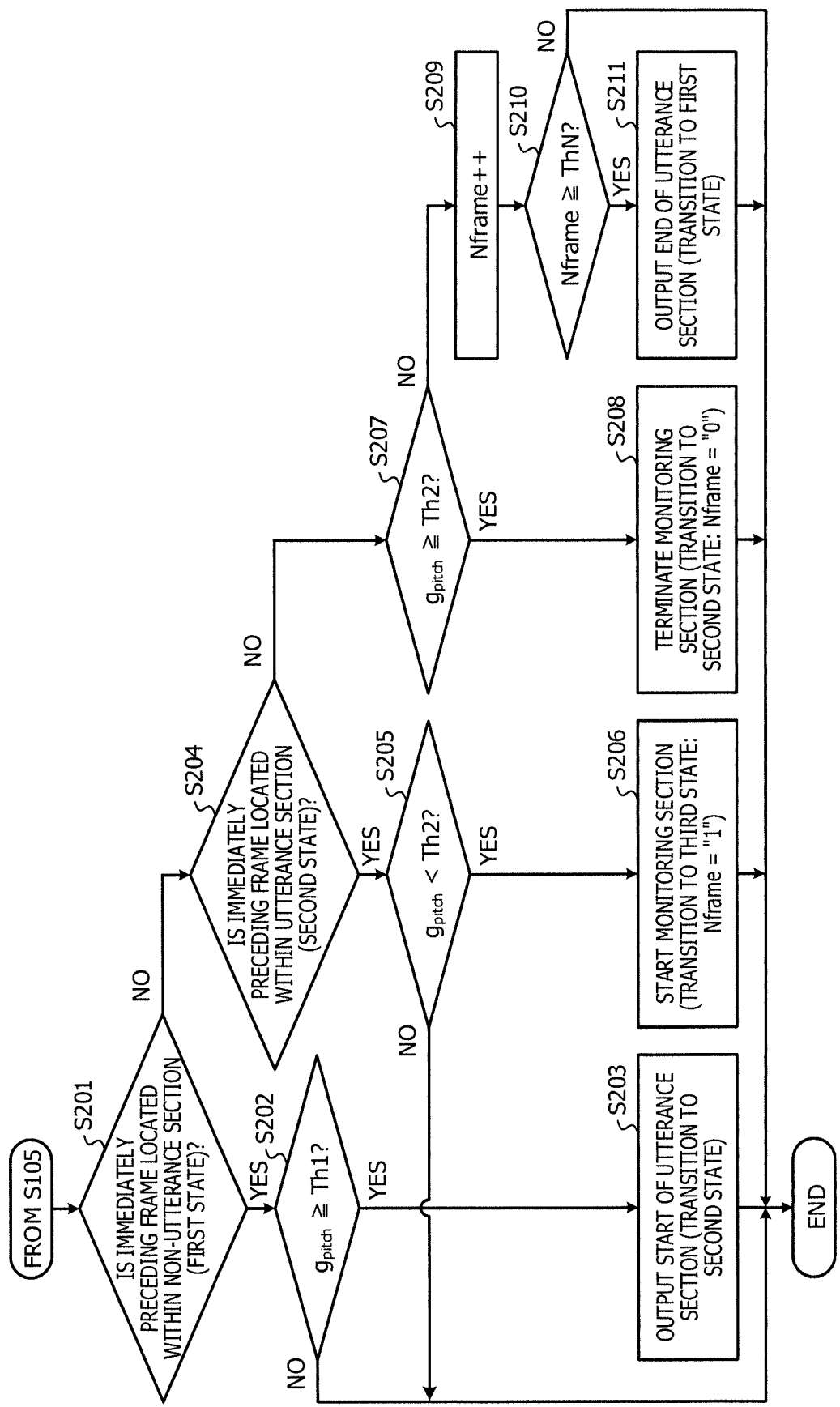
FIG. 8 is an operational flowchart of utterance section detection processing, which is based on the example of a modification.

FIG. 8 is an operational flowchart of utterance section detection processing, which is based on this example of a modification. Note that since, compared with the utterance section detection processing based on the above-mentioned embodiment and illustrated in FIG. 4, processing operations in and before step S105 are the same, processing operations after step S105 will be described in FIG. 8.

The utterance section detection unit 26 determines whether or not the immediately preceding frame is included in a non-utterance section (step S201). In other words, the utterance section detection unit 26 determines whether or not the detected state of an utterance section in the immediately preceding frame is the first state. In a case where the immediately preceding frame is included in the non-utterance section (step S201: Yes), the utterance section detection unit 26 determines whether or not the pitch gain gpitch of the current frame is greater than or equal to the relatively high first threshold value Th1 (step S202). In a case where the pitch gain gpitch of the current frame is greater than or equal to the first threshold value Th1 (step S202: Yes), the utterance section detection unit 26 determines that the utterance section starts from the current frame, and the utterance section detection unit 26 outputs information indicating that the utterance section starts (step S203). In other words, the detected state of the utterance section makes a transition from the first state to the second state.

On the other hand, in a case where the pitch gain gpitch of the current frame is less than the first threshold value Th1 (step S202: No), the utterance section detection unit 26 determines that the current frame is not included in the utterance section. In other words, the detected state of the utterance section is maintained as the first state. In addition, the processing unit 13 terminates the utterance section detection processing.

In addition, in a case where, in step S201, the immediately preceding frame is not included in the non-utterance section (step S201: No), the utterance section detection unit 26 determines whether or not the immediately preceding frame is included in the utterance section (step S204). In other words, the utterance section detection unit 26 determines whether or not the detected state of the utterance section in the immediately preceding frame is the second state. In a case where the immediately preceding frame is included in the utterance section (step S204: Yes), it is determined whether or not the pitch gain gpitch of the current frame is less than the relatively low second threshold value Th2 (step S205). In a case where the pitch gain gpitch of the current frame is less than the second threshold value Th2 (step S205: Yes), the utterance section detection unit 26 starts a monitoring section (step S206). In other words, the detected state of the utterance section makes a transition from the second state to the third state. In addition, the utterance section detection unit 26 sets, to "1", the number Nframe of frames after the start of the monitoring section, which indicates a time period for which the monitoring section lasts. On the other hand, in a case where the pitch gain gpitch of the current frame is greater than or equal to the second threshold value Th2 (step S205: No), the utterance section detection unit 26 determines that the utterance section lasts in the current frame. In other words, the detected state of the utterance section is maintained as the second state. In addition, the processing unit 13 terminates the utterance section detection processing.

In addition, in a case where, in step S204, the immediately preceding frame is not included in the utterance section (step S204: No), the monitoring section is ongoing (the third state). In this case, the utterance section detection unit 26 determines whether or not the pitch gain gpitch of the current frame is greater than or equal to the second threshold value Th2 (step S207). In a case where the pitch gain gpitch of the current frame is greater than or equal to the second threshold value Th2 (step S207: Yes), the utterance section detection unit 26 terminates the monitoring section (step S208). In other words, the detected state of the utterance section makes a transition from the third state to the second state. In addition, the utterance section detection unit 26 resets Nframe to "0".

On the other hand, in a case where the pitch gain gpitch of the current frame is less than the second threshold value Th2 (step S207: No), the utterance section detection unit 26 increments Nframe by "1" (step S209). In addition, the utterance section detection unit 26 determines whether or not Nframe becomes greater than or equal to the number ThN of frames indicating a threshold value for the length of the monitoring section (step S210). Note that ThN is set to the number of frames corresponding to one second, for example. In a case where Nframe is greater than or equal to ThN (step S210: Yes), the utterance section detection unit 26 determines that the utterance section ends in the current frame, and the utterance section detection unit 26 outputs information indicating that the utterance section ends (step S211). In other words, the detected state of the utterance section makes a transition from the third state to the first state. Note that, in this case, the utterance section detection unit 26 may determine that the utterance section ends at a point of time when the monitoring section starts.

On the other hand, in a case where Nframe is less than ThN (step S210: No), the utterance section detection unit 26 determines that the monitoring section lasts in the current frame. In other words, the detected state of the utterance section is maintained as the third state. In addition, the processing unit 13 terminates the utterance section detection processing.

According to this example of a modification, even in a case where a noise component within the audio signal enlarges an error in the pitch gain, the utterance section detection unit 26 is able to adequately detect a timing at which the utterance section ends.

According to yet another example of a modification, the utterance section detection unit 26 may adjust the second threshold value in accordance with an elapsed time from a start of the utterance section. In the same way, the utterance section detection unit 26 may adjust the first threshold value in accordance with an elapsed time from an end of the utterance section.

Figure 9A:
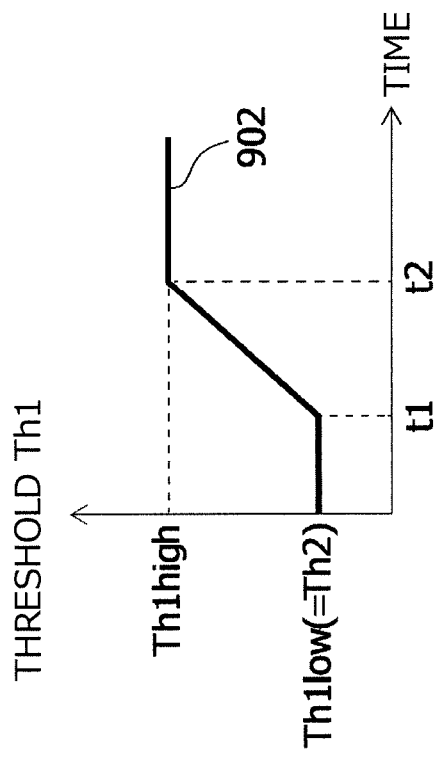
FIG. 9A is a diagram illustrating an example of a relationship between an elapsed time from a start of an utterance section and a second threshold value, which is based on an example of a modification.
Figure 9B:
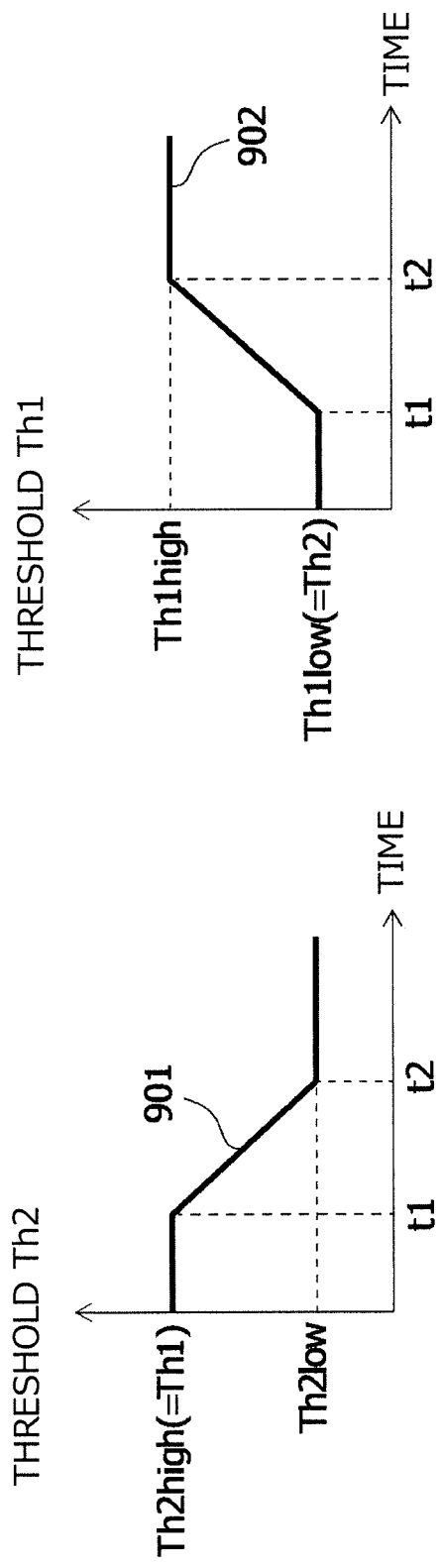
FIG. 9б is a diagram illustrating an example of a relationship between an elapsed time from an end of the utterance section and a first threshold value, which is based on the example of a modification.

FIG. 9A illustrates an example of a relationship between an elapsed time from a start of the utterance section and the second threshold value Th2, which is based on this example of a modification. In addition, FIG. 9B illustrates an example of a relationship between an elapsed time from an end of the utterance section and the first threshold value Th1, which is based on this example of a modification. In each of FIG. 9A and FIG. 9B, a horizontal axis indicates a time, and a vertical axis indicates a threshold value. In addition, a polygonal line 901 illustrated in FIG. 9A indicates a relationship between the elapsed time from a start of the utterance section and the second threshold value Th2. In addition, a polygonal line 902 illustrated in FIG. 9B indicates a relationship between the elapsed time from an end of the utterance section and the first threshold value Th1.

In the example illustrated in FIG. 9A, it is assumed that the utterance section starts at a time t1. As illustrated by the polygonal line 901, from the time t1 toward a time t2, the second threshold value Th2 linearly decreases, in response to the elapsed time, from Th2high having the same value as that of the first threshold value Th1. In addition, after the time t2, the second threshold value Th2 becomes a given value Th2low. In the same way, in the example illustrated in FIG. 9B, it is assumed that the utterance section ends at the time t1. As illustrated by the polygonal line 902, from the time t1 toward the time t2, the first threshold value Th1 linearly increases, in response to the elapsed time, from Th1low having the same value as that of the second threshold value Th2. In addition, after the time t2, the first threshold value Th1 becomes a given value Th1high. Note that it is desirable that an interval from the time t1 to the time t2 is set less than one second, for example, more specifically, is set to 0.2 seconds to 0.4 seconds.

In this way, by causing each of the first threshold value and the second threshold value to smoothly change in response to a lapse of time, the utterance section detection unit 26 is able to adequately detect the utterance section even in a case where a temporal variation of the pitch gain is great.

According to yet another example of a modification, the pitch gain calculation unit 25 may calculate the pitch gain, based on a long-term autocorrelation of a residual signal for a linear prediction component of the audio signal. Note that the long-term autocorrelation of the residual signal indicates a remaining autocorrelation obtained by removing a short-term correlation component from the audio signal. In this case, the pitch gain calculation unit 25 calculates linear prediction coefficients of the audio signal. At that time, the pitch gain calculation unit 25 only has to calculate the linear prediction coefficients in accordance with a method specified in Chapter 5.2.2 of TTC standard JT-G722.2 specification, for example. In addition, the pitch gain calculation unit 25 calculates a residual signal res(n) in accordance with the following Expression.

$$res(n) = s_k(n) + \sum_{i=1}^{p} a(i) \cdot s_k(n-i) \ (n = 0, 1, \ldots, N-1)$$

Here, a(i) is a linear prediction coefficient, and "p" is the degree (16, for example) of the linear prediction coefficients.

The pitch gain calculation unit 25 calculates a long-term autocorrelation Cres(d) of the residual signal in accordance with the following Expression.

$$C_{res}(d) = \sum_{n=0}^{N-1} res(n) \cdot res(n-d) \ (d = d_{low}, \ldots, d_{high})$$

Note that the minimum value dlow and the maximum value dhigh of the delay amounts d are set in the same way as in Expression (4) in the above-mentioned embodiment so that a delay amount equivalent to a fundamental frequency of a human voice is included.

After calculating the long-term autocorrelation Cres(d) of the residual signal for each of the delay amounts d included in the range of the delay amounts, the pitch gain calculation unit 25 obtains a maximum value Cres(dmax) from among the long-term autocorrelations Cres(d). Note that dmax is a delay amount corresponding to the maximum value Cres (dmax) of the long-term autocorrelations Cres(d) and this delay amount corresponds to the pitch period. In addition, the pitch gain calculation unit 25 only has to calculate the pitch gain gpitch in accordance with the following Expression.

$$g_{pitch} = \frac{C_{res}(d_{max})}{\sum_{n=0}^{N-1} res(n) \cdot res(n)}$$

In addition, in one of the above-mentioned embodiment and examples of a modification, the utterance section detection apparatus 1 may directly detect the utterance section from the audio signal without detecting the voiced sound section. In other words, the pitch gain calculation unit 25 calculates the pitch gain for each of all frames, and regardless of whether or not being the voiced sound section, the utterance section detection unit 26 only has to detect the utterance section, based on a result of a comparison between the pitch gain and the first threshold value Th1 or second threshold value Th2.

For this reason, while there is a possibility that the detection accuracy of the utterance section is slightly reduced, a computation amount taken to detect the utterance section is reduced. In this case, the voiced sound determination unit 24 out of individual units included in the processing unit 13 may be omitted. In addition, in a case where the SN ratio is not used for adjusting the first threshold value Th1 or the second threshold value Th2, the power calculation unit 21, the noise estimation unit 22, and the signal-to-noise ratio calculation unit 23 may be omitted.

In addition, an utterance section detection apparatus according to one of the above-mentioned embodiment and examples of a modification may be implemented into a server-client type system.

Figure 10:
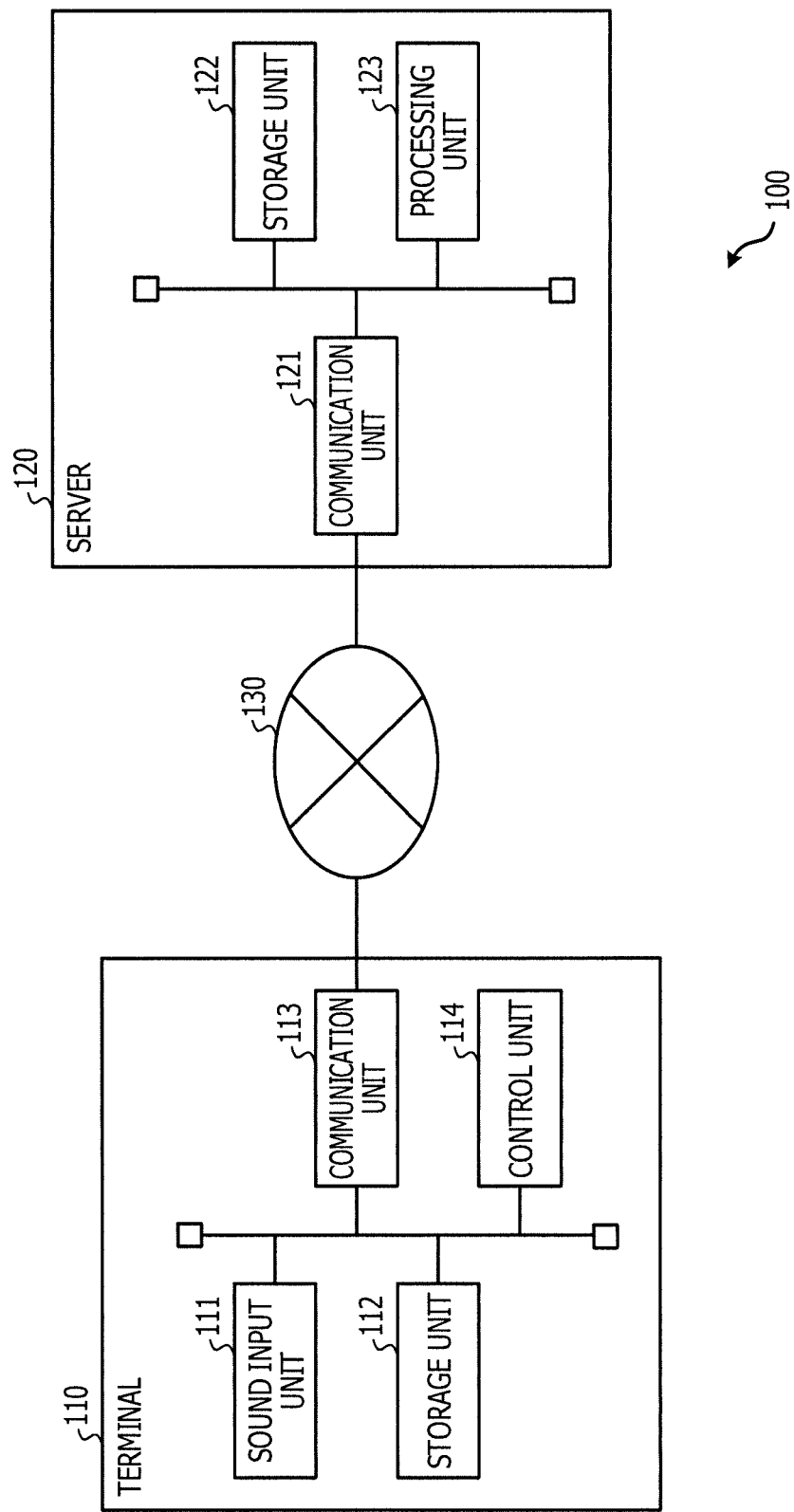
FIG. 10 is a schematic configuration diagram of a server client system into which an utterance section detection apparatus based on the embodiment or an example of a modification thereto is implemented.

FIG. 10 is a schematic configuration diagram of a server client system into which an utterance section detection apparatus based on one of the above-mentioned embodiment and examples of a modification thereto is implemented.

A server client system 100 includes a terminal 110 and a server 120, and the terminal 110 and the server 120 are communicatable with each other via a communication network 130. Note that the terminals 110 included in the server client system 100 may exist. In the same way, the servers 120 included in the server client system 100 may exist.

The terminal 110 includes a sound input unit 111, a storage unit 112, a communication unit 113, and a control unit 114. The sound input unit 111, the storage unit 112, and the communication unit 113 are coupled to the control unit 114 via a bus, for example.

The sound input unit 111 includes an audio interface and an AD converter, for example. In addition, the sound input unit 111 acquires, from, for example, a microphone, an audio signal serving as an analog signal and samples that audio signal at a predetermined sampling rate, thereby digitalizing that audio signal. In addition, the sound input unit 111 outputs the digitalized audio signal to the control unit 114.

The storage unit 112 includes a non-volatile semiconductor memory and a volatile semiconductor memory, for example. In addition, the storage unit 112 stores therein a computer program for controlling the terminal 110, identification information of the terminal 110, various kinds of data and a computer program, which are used by the utterance section detection processing, and so forth.

The communication unit 113 includes an interface circuit for coupling the terminal 110 to the communication network 130. In addition, along with the identification information of the terminal 110, the communication unit 113 transmits the audio signal received from the control unit 114, to the server 120 via the communication network 130.

The control unit 114 includes one or more processors and peripheral circuits thereof. In addition, along with the identification information of the terminal 110, the control unit 114 transmits the audio signal to the server 120 via the communication unit 113 and the communication network 130. In addition, the control unit 114 displays a processing result of the audio signal, received from the server 120, on a display (not graphically illustrated) or reproduces a synthesized voice signal corresponding to that processing result via a speaker (not graphically illustrated).

The server 120 includes a communication unit 121, a storage unit 122, and a processing unit 123. The communication unit 121 and the storage unit 122 are coupled to the processing unit 123 via a bus.

The communication unit 121 includes an interface circuit for coupling the server 120 to the communication network 130. In addition, the communication unit 121 delivers the audio signal and the identification information of the terminal 110 from the terminal 110 to the processing unit 123 via the communication network 130.

The storage unit 122 includes a non-volatile semiconductor memory and a volatile semiconductor memory, for example. In addition, the storage unit 122 stores therein a computer program for controlling the server 120, and so forth. In addition, the storage unit 122 may store therein a computer program for performing the utterance section detection processing and audio signals received from respective terminals.

The processing unit 123 includes one or more processors and peripheral circuits thereof. In addition, the processing unit 123 realizes functions of respective processing units of an utterance section detection apparatus based on one of the above-mentioned embodiment and examples of a modification. Furthermore, the processing unit 123 performs, on the detected utterance section, predetermined processing such as sound recognition, thereby obtaining a processing result thereof. In addition, the processing unit 123 transmits that processing result to the terminal 110 via the communication unit 121 and the communication network 130.

A computer program for causing a computer to realize functions included in respective processing units of the utterance section detection apparatus based on one of the above-mentioned embodiment and examples of a modification may be provided in a form of being recorded in a computer-readable medium such as a magnetic recording medium or an optical recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for utterance section detection, the apparatus comprising:
a memory; and
a processor coupled to the memory and configured to
execute signal-to-noise component ratio calculation processing that includes calculating a signal-to-noise component ratio of an audio signal for each frame of frames obtained by dividing the audio signal, the frame having a given length,
execute first detection processing that includes detecting, based on the signal-to-noise component ratio of at least one frame among the frames, a first section within a given length of the at least one frame indicative of an utterance in which the audio signal includes a signal component whose signal-to-noise component ratio is larger than a predetermined threshold,
execute pitch gain calculation processing when the first section is detected by the first detection processing, the pitch gain calculation processing being configured to calculate, based upon sampling points and reference delay amounts corresponding to the utterance, a pitch gain indicating an intensity of periodicity of the audio signal included in the detected first section, and
execute utterance section detection processing when the pitch gain calculation processing is executed on the detected first section, the utterance section being configured to determine that an utterance section on the audio signal starts when the pitch gain within the detected first section becomes greater than or equal to a first threshold value after a non-utterance section on the audio signal lasts, wherein the utterance section detection processing further includes determining that the utterance section ends when the pitch gain within the detected first section becomes less than a second threshold value lower than the first threshold value after the utterance section lasts,
wherein the utterance section detection processing includes causing the second threshold value to increase with an increase in the pitch gain in a frame among the at least one frame from which the utterance section is determined to start,
wherein the increase of the second threshold value is configured to multiply the second threshold by a relative ratio of the pitch gain to the first threshold to obtain a corrected second threshold.

2. The apparatus according to claim 1,
wherein the utterance section detection processing includes causing the first threshold value and the second threshold value in a frame among the at least one frame to increase with an increase in the signal-to-noise component ratio in the frame.

3. The apparatus according to claim 1,
wherein the utterance section detection processing includes causing the first threshold value and the second threshold value to increase with an increase in the signal-to-noise component ratio in a frame among the at least one frame from which the first section is determined to start.

4. The apparatus according to claim 1,
wherein the utterance section detection processing includes determining that the utterance section ends when a time period during which the pitch gain is less than the second threshold value lasts for a given period of time in a case where the utterance section lasts.

5. The apparatus according to claim 1, the apparatus further comprising:
a microphone configured to acquire the audio signal.

6. A method for utterance section detection, the method comprising:
executing signal-to-noise component ratio calculation processing that includes calculating a signal-to-noise component ratio of an audio signal for each frame of frames obtained by dividing the audio signal, the frame having a given length;
executing first detection processing that includes detecting, based on the signal-to-noise component ratio of at least one frame among the frames, a first section within a given length of the at least one frame indicative of an utterance in which the audio signal includes a signal component whose signal-to-noise component ratio is larger than a predetermined threshold;
executing pitch gain calculation processing when the first section is detected by the first detection processing, the pitch gain calculation processing being configured to calculate, based upon sampling points and reference delay amounts corresponding to the utterance, a pitch gain indicating an intensity of periodicity of the audio signal included in the detected first section; and
executing utterance section detection processing when the pitch gain calculation processing is executed on the detected first section, the utterance section being configured to determine that an utterance section on the audio signal starts when the pitch gain within the detected first section becomes greater than or equal to a first threshold value after a non-utterance section on the audio signal lasts, wherein the utterance section detection processing further includes determining that the utterance section ends when the pitch gain within the detected first section becomes less than a second threshold value lower than the first threshold value after the utterance section lasts,
wherein the utterance section detection processing includes causing the second threshold value to increase with an increase in the pitch gain in a frame among the at least one frame from which the utterance section is determined to start,
wherein the increase of the second threshold value is configured to multiply the second threshold by a relative ratio of the pitch gain to the first threshold to obtain a corrected second threshold.

7. A non-transitory computer-readable storage medium for storing a program for utterance section detection, the program causing a computer to execute a process, the process comprising:
executing signal-to-noise component ratio calculation processing that includes calculating a signal-to-noise component ratio of an audio signal for each frame of frames obtained by dividing the audio signal, the frame having a given length;
executing first detection processing that includes detecting, based on the signal-to-noise component ratio of at least one frame among the frames, a first section within a given length of the at least one frame indicative of an utterance in which the audio signal includes a signal component whose signal-to-noise component ratio is larger than a predetermined threshold;
executing pitch gain calculation processing when the first section is detected by the first detection processing, the pitch gain calculation processing being configured to calculate, based upon sampling points and reference delay amounts corresponding to the utterance, a pitch gain indicating an intensity of periodicity of the audio signal included in the detected first section; and executing utterance section detection processing when the pitch gain calculation processing is executed on the detected first section, the utterance section being configured to determine that an utterance section on the audio signal starts when the pitch gain within the detected first section becomes greater than or equal to a first threshold value after a non-utterance section on the audio signal lasts, wherein the utterance section detection processing further includes determining that the utterance section ends when the pitch gain within the detected first section becomes less than a second threshold value lower than the first threshold value after the utterance section lasts, wherein the utterance section detection processing includes causing the second threshold value to increase with an increase in the pitch gain in a frame among the at least one frame from which the utterance section is determined to start, wherein the increase of the second threshold value is configured to multiply the second threshold by a relative ratio of the pitch gain to the first threshold to obtain a corrected second threshold.

* * * * *